United States Patent [19]
Elliott

[11] 4,128,170
[45] Dec. 5, 1978

[54] COMBINATION TACKLE BOX, BAIT HOLDER, COOLER AND SEAT MEANS

[76] Inventor: Charles Elliott, 6827 Radial Dr., Fayetteville, N.C. 28301

[21] Appl. No.: 876,675

[22] Filed: Feb. 10, 1978

[51] Int. Cl.² .................. A63D 55/00; B65D 85/00
[52] U.S. Cl. .............................. 206/315 R; 220/20; 43/54.5 R; 43/57.5 R; 312/270
[58] Field of Search .............. 206/315, 317; 220/20, 220/21; 43/54.5, 57.5; 312/DIG. 33, 269, 270

[56] References Cited
U.S. PATENT DOCUMENTS

| | | | |
|---|---|---|---|
| 1,576,688 | 3/1926 | Thompson | 43/54.5 R |
| 2,762,674 | 9/1956 | Sauvago | 220/20 |
| 3,022,600 | 2/1962 | Glascoff | 43/57.5 R |
| 3,182,872 | 5/1965 | Brosseau | 43/57.5 R |
| 3,378,134 | 4/1968 | Wilkinson | 312/DIG. 33 |
| 3,399,939 | 9/1968 | Anderson | 206/315 |
| 3,670,918 | 6/1972 | Mitchell | 220/20 |
| 3,831,743 | 8/1974 | Leedy | 220/20 |
| 3,948,579 | 4/1976 | Shirmer | 206/315 |
| 4,023,304 | 5/1977 | Singer | 43/54.5 R |

*Primary Examiner*—Herbert F. Ross
*Attorney, Agent, or Firm*—Mills & Coats

[57] ABSTRACT

In abstract a preferred embodiment of this invention is either a generally cubical or cylindrical shaped insulated cooler with a plurality of latch means for securing thereto a combination tackle box, bait well and seat means on the upper portion thereof. Means are provided for giving ready access to the cooler portion of the present invention as well as providing for maintaining perishable bait in a cooled condition without contaminating ice and other products contained within the cooler reservoir.

5 Claims, 3 Drawing Figures

COMBINATION TACKLE BOX, BAIT HOLDER, COOLER AND SEAT MEANS

BACKGROUND OF INVENTION

This invention relates to fishing support equipment and more particularly to combination cooler, bait well, tackle box, and seat means.

Various types of combination fisherman's appliances have been devised over the years to better organize fishermen to make the fisherman's lot more comfortable, particularly during long periods of waiting.

These various devices have included rather large combination tackle boxes and seats, folding canvas type seats with tray type tackle boxes mounted thereunder, seats with cooling chambers and folding back rests, and the like. None of these various prior known devices or systems however have provided the fisherman with convenience and access without a good deal of effort in retrieving the product desired, whether it be something from the cooler, perishable bait, or fishing tackle.

SUMMARY OF INVENTION

After much research and study into the above mentioned problems, the present invention was developed to provide a light-weight, readily accessible cooler means having in combination therewith a means for preserving perishable bait such as cut bait, shrimp, worms, or the like while at the same time providing space for necessary changes and spares of fishing tackle in a convenient seat-type configuration. The simplicity and ease of access in the present invention as well as its ruggedness provides a combination fishing appliance with is easy to use, is simple in construction and is designed for lifetime use.

In view of the above, it is the object of the present invention to provide a combination fishing appliance including a cooler reservoir, a plurality of preserving bait wells, and means for storing fishing tackle, all so constructed as to act as a seat means for the fisherman.

Another object of the present invention is to provide top-loading type, generally cubical or cylindrical shaped cooler means having a completely separable cover portion including bait wells, tackle storage container means and a relatively small but convenient through the cover access means to the cooler portion of the device.

Another object of the present invention is to provide a combination fishing appliance including a cooler means having lock down means for the cover thereof on at least three sides thereby providing even hold-down and sealing pressure at all points.

Another object of the present invention is to provide, in the cover of a top loading cooler type device, a relatively small but readily accessable opening through said cover to the interior of cooler without opening or removing the cover therefrom.

Another object of the present invention is to provide in combination with a top loading cooler, tackle storage means and perishable bait storage means in the lid or cover thereof.

Another object of the present invention is to provide in combination top loading cooler means, tackle box and bait well, pivotable handle means for readily transporting the same from one location to another.

Another object of the present invention is to provide, in a cooler means, a relatively small access opening for depositing fish and other products within said cooler without opening the lid thereof.

A further object of the present invention is to provide, in a generally rectangular cooler means having a conforming detachable lid thereto, a generally circular, relatively small opening in said lid for depositing and removing products from the interior of the cooler without removing or otherwise opening said lid means.

Further object and advantages of the invention will become apparent and obvious from a study of the following description and the accompanying drawings wihch are merely illustrative of such invention.

DETAILED DESCRIPTION OF INVENTION

With further reference to the drawings, the combination fisherman's appliance of the present invention, indicated generally at 10, includes a top-loading type cooler portion indicated generally at 11 and a combination cooler closure, bait well, tackle holder and cooler access opening indicated generally at 12.

The cooler portion 11 is preferable composed of an outer shell 13 of relatively wear and corrosive resistant material such as the more dense plastic compositions.

Cooler shell 13 has juxtaposed to its interior sides and bottom an insulating liner 14. The upper periphery of shell 13 and liner 14 form cooler lip 15.

Figure 2:
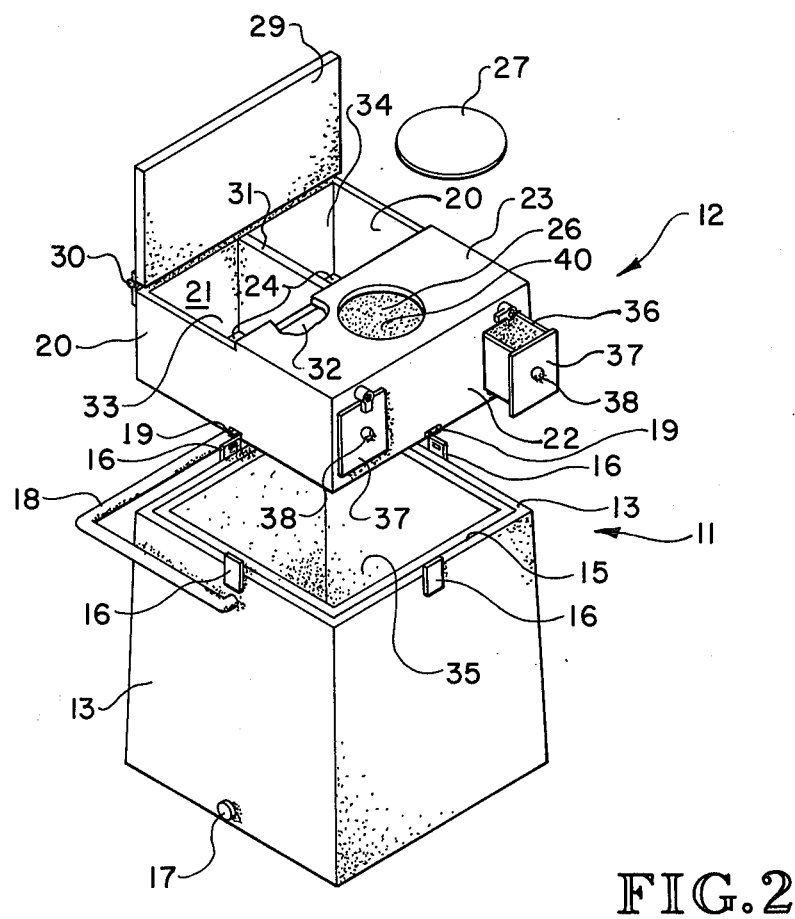
FIG. 2 is an exploded view thereof.

Spaced periodically about the periphery of lip 15, centrally on each side of the generally cubical shaped cooler as shown in FIG. 2 (and at least at approximately one-third intervals if the cooler configuration is cylindrical, not shown) are a plurality of latch means 16. These means can be any one of a number of commonly used latch means for securing coolers to their lids and further detailed description thereof is not deemed necessary since they are well known to those skilled in the art.

Adjacent the bottom of the cooler portion 11 is provided a standard drain plug 17 of either the screw-on or snap-on closure type. This drain plug of course allows the user of the appliance of the present invention to drain off excess water from the cooler as deemed necessary.

A pivotable handle 18 is also provided which is connected on opposite sides of cooler portion 11 as seen in the Figs. The details of this pivotable handle is considered well known to those skilled in the art and further description thereof is not deemed necessary.

Figure 1:
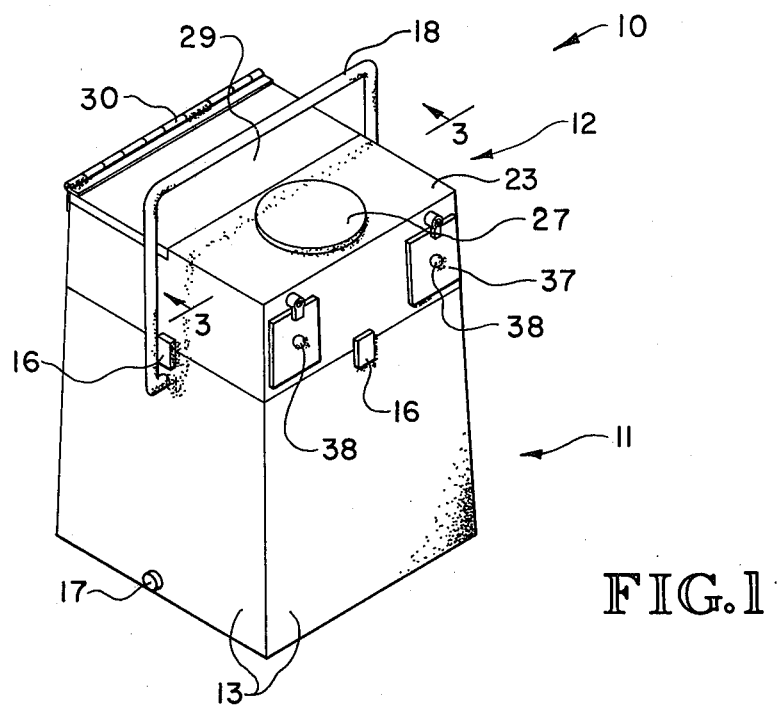
FIG. 1 is a perspective view of the combination tackle box, bait holder, cooler and seat means of the present invention.

The closure portion 12 of the present invention includes a plurality of latching engaging means 19 spaced about the lower periphery of said closure in operative alignment with latch means 16 when in the mated position shown in FIG. 1.

Closure portion 12 is preferable generally rectangular in shape and includes side walls 20, a back wall 21, and a front wall 22. A fixed top portion 23 is provided as seen clearly in FIG. 2 as is a bottom portion 24. A retaining shoulder or flange 25 is provided about the about the interior periphery of bottom portion 24 and is so sized to fit interiorly of liner 14 thus acting a retaining means as can clearly be seen in FIG. 3.

A generally cylindrical access sleeve 26 is provided which extends from and through bottom portion 24 to top portion 23 and provides readily communicative access from the exterior of the appliance of the present invention, through the closure portion 12, to the interior of cooler portion 11.

Figure 3:
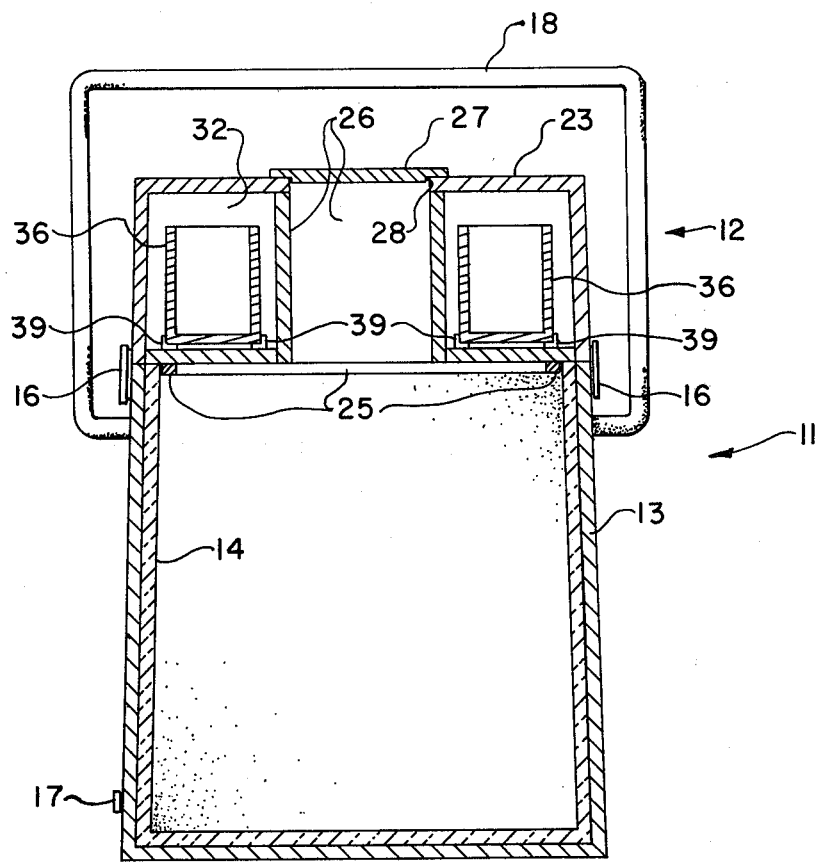
FIG. 3 is a section view taken through lines 3—3 of FIG. 1.

An access cover 27 generally conforms to cylindrical sleeve 26 and includes a shoulder 28 for retaining said cover relative to the open ambit end of sleeve 26 as can clearly be seen in FIG. 3.

Adjacent fixed top portion 23 is a pivoted bait well cover 29 secured to a back wall 21 of cooler closure 12 by means such as hinge 30. A partition 31 is provided between back wall 21 and bait well wall 32 to form two bait wells 33 and 34. The advantage in having dual bait wells is of course to allow the fisherman to maintain a plurality of baits such as squid and shrimp or either of these two in combination with cut bait without intermingling the same. Since the bottom wall or portion 24 of closure 12 is relatively thin and is disposed adjacent the interior 35 of cooler 11, bait contained within bait wells 33 and 34 will remain cool when ice or other coolants are maintained within cooler 11.

A plurality of drawer means, indicated at 36, are provided which include front portions 37 and pull handles 38. These drawers are preferable mounted on guides 39 as seen in FIG. 3 and operate in the normal manner of such devices.

In use of the combination fisherman's appliance of present invention, to fill the interior 35 of the cooler portion 11, latches 16 are disengaged and combination cover portion 12 lifted off. The interior can then be filled with ice, drinks, perishable foods or other desired items. Combination cover portion 12 is then replaced on the upper edge of lip 15 of cooler portion 11 and is properly located by mating retaining shoulder or flange 25 interiorally of the insulating lining of 14 as seen clearly in FIG. 3. Latches 16 on cooler portion 11 are then latchingly engaged with means 19 on the combination cover 12 so that the two portions are securely and tightly connected on all sides.

The combination fisherman's appliance of the present invention can then be transported to any desired appropriate location such as the shore or beach adjacent the area the fisherman intends to fish or the same can be placed in a boat for use therin by such fisherman.

Once the fishing operation begins, drawers 36 can be opened as desired by manipulating pulls 38 and sliding the same outwardly to expose appropriate tackle contained therein.

Usually during the filling of the cooler portion 11, perishable bait would be placed in one or both of the bait wells 33 or 34 and the hinged cover 29 closed thereover. Once fishing begins, cover 29 can be opened as shown in the exploded view of FIG. 2 and the appropriate bait removed from the bait well which is kept cool because of the bottom 24 thereof being exposed to interior 35 of the cooler 11.

Whenever it is desired to remove additional bait, drinks or other items from the interior 35 of cooler portion 11, it is not necessary to disengage latches 16 and remove combination cover portion 12, but only to remove cover 27 from sleeve opening 40 which communicates from the exterior of portion 12 to the interior 35 of cooler 11. The fisherman or other user of appliance of present invention simply sticks his hand down through opening 40 of sleeve 26 and retrieves the desired product therein.

Whenever the fisherman catches fish, rather than either throwing them on the bank or in the bottom of the boat to possibly spoil or having to release latches or lid hold downs to place a fish in a standard cooler, small cover 27 is simply removed and the fish is dropped down the hole or opening 40 into the interior 35 of cooler 11. This is a simple, one-handed operation and yet allows fish that are caught to remain fresh and iced down immediately after being caught.

Whenever the user of the appliance of the present invention becomes tired, the generally flat surface formed by top portion 23 and lid 29 serve as a seat area and handle 18 can be folded downwardly as shown in FIG. 2 to expose the entire top surface. The location of sleeve openeing 40 is very convenient in that the user sitting on the appliance of the present invention only has to spread his legs to reach straight down in the cooler without having to get up to place items in the cooler or to retrieve them therefrom. This is a convenience which, along with the adjacent location of tackle drawers 36, is extremely handy and convenient.

Whenever it is desired to move the appliance of the present invention to a different location, all that is necessary is for handle 18 to be moved to the position shown in FIG. 1 and the entire appliance can be picked up and carried.

It is of course a simple matter to unload cooler portion 11 by releasing latches 16 and removing cover portion 12 whenever emptying of interior 35 is desired.

From the above it is obvious that the present invention has the advantage of providing a relatively inexpensive and yet durable, highly convenient combination tackle box, bait holder, cooler and seat means.

Present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A combination fisherman's appliance comprising: a top loading type cooler means; a combination cooler closure means having a bottom portion adapted to meshingly engage and cover the open top of said cooler, side portions, a front portion, a rear portion, and a fixed partial top portion; a bait well wall extending between side portions and said top and bottom portions; an openable top portion hingedly disposed between said bait well wall and said rear portion whereby a bait well is formed with top access thereto being provided; drawer means slidingly disposed through said front portion and extending inwardly therefrom to a point adjacent the bait well wall whereby fishing tackle may be stored in said closure; and aperture means in said fixed top portion and said bottom portion providing access to the interior of said cooler without removing said cooler closure means.

2. The combination fisherman's appliance of claim 1 wherein an exterior cover is provided for said access means adjacent said top portion.

3. The combination fisherman's appliance of claim 1 wherein said cooler is generally cubical in shape.

4. The combination fisherman's appliance of claim 1 wherein the cooler is generally cylindrical in shape.

5. The combination fisherman's appliance of claim 1 wherein at least three generally equidistantly disposed latch means are provided about the periphery of the joint between said cooler means and said closure means whereby said cooler and said closure can be tightly connected together.

* * * * *